United States Patent
Shi

(10) Patent No.: US 10,254,101 B2
(45) Date of Patent: Apr. 9, 2019

(54) DEVICE FOR DETECTING ROTATION ANGLE OF PRISM AND METHOD FOR USING THE SAME

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Yue Shi, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 171 days.

(21) Appl. No.: 15/233,152

(22) Filed: Aug. 10, 2016

(65) Prior Publication Data

US 2017/0102221 A1   Apr. 13, 2017

(30) Foreign Application Priority Data

Oct. 10, 2015 (CN) .......................... 2015 1 0652657

(51) Int. Cl.
*G01B 5/24* (2006.01)
*G02B 27/62* (2006.01)
(Continued)

(52) U.S. Cl.
CPC ............... *G01B 5/24* (2013.01); *G01B 3/563* (2013.01); *G02B 6/0036* (2013.01); *G02B 27/62* (2013.01)

(58) Field of Classification Search
CPC ........ G01B 5/24; G01B 3/563; G02B 6/0036; G02B 27/62
See application file for complete search history.

(56) References Cited

FOREIGN PATENT DOCUMENTS

| CN | 2932428 Y | 8/2007 |
| CN | 203732240 U | 7/2014 |

(Continued)

OTHER PUBLICATIONS

First Office Action for Chinese Application No. 201510652657.0, dated May 2, 2017, 9 Pages.

(Continued)

*Primary Examiner* — Anh T Mai
*Assistant Examiner* — Nathaniel J Lee
(74) *Attorney, Agent, or Firm* — Brooks Kushman P.C.

(57) ABSTRACT

The present disclosure provides a device for detecting a rotation angle of a prism and a method for using the same. The device for detecting a rotation angle of a prism is configured to detect, in the case that a prism film plate of a backlight module rotates relative to a display panel until the display panel displays a predetermined image, a rotation angle of the prism film plate relative to the display panel. The device for detecting a rotation angle of a prism includes: a stationary protractor; a film plate clamping mechanism configured to clamp the prism film plate; and a rotation mechanism which rotates the film plate clamping mechanism around an axis of the protractor. When the rotation mechanism drives the film plate clamping mechanism to rotate and the film plate clamping mechanism drives the prism film plate to rotate until the display panel displays the predetermined image, the rotation angle is detected based on an angle by which the film plate clamping mechanism rotates relative to the protractor.

16 Claims, 1 Drawing Sheet

(51) Int. Cl.
*F21V 8/00* (2006.01)
*G01B 3/56* (2006.01)

(56) References Cited

FOREIGN PATENT DOCUMENTS

| | | | |
|---|---|---|---|
| CN | 203759382 U | | 8/2014 |
| CN | 204229078 U | * | 3/2015 |
| CN | 204229078 U | | 3/2015 |
| KR | 1020060000978 A | | 1/2006 |

OTHER PUBLICATIONS

Second Office Action for Chinese Application No. 201510652657.0, dated Jan. 19, 2018, 10 Pages.

\* cited by examiner

DEVICE FOR DETECTING ROTATION ANGLE OF PRISM AND METHOD FOR USING THE SAME

CROSS-REFERENCE TO RELATED APPLICATIONS

This application claims priority to Chinese application No. 201510652657.0, filed Oct. 10, 2015, which is hereby incorporated by reference in its entirety.

TECHNICAL FIELD

The present disclosure relates to the field of displayer manufacture technology, and in particular to a device for detecting a rotation angle of a prism and a method for using the same.

BACKGROUND

A displayer mainly includes a liquid crystal panel and a backlight module, which applies the physical characteristic of liquid crystals. Its working principle is described as follows: liquid crystal molecules are arranged in order when a voltage is applied thereon, so as to make the light pass through; when no voltage is applied on the liquid crystal molecules, the light is blocked. Because the liquid crystal molecule itself cannot emit light, a backlight module is required so as to achieve the display. The backlight module is characterized in high brightness, long service life and capable of emitting light uniformly.

When an external voltage is applied to the liquid crystal screen, the liquid crystal molecules therein may be rearranged. In order to detect such rearrangement and make it sensible, visible for human eyes or achieve a maximum contrast ratio, it is required to arrange polarizing films at an upper and a lower surface of the liquid crystal screen respectively. In addition, in order to make the optical performance of the backlight module match with the liquid crystal screen so as to achieve a fine image quality, a prism film plate in the backlight module needs to be rotated in a certain angle, so as to prevent the occurrence of oblique stripes in the display image of the liquid crystal panel.

A parameter of the rotation angle of the prism of the backlight module in the related art is generally the empirical parameter used by those skilled in the art, which is acquired by a manual simulation and repeatedly testing the image quality of the liquid crystal module. However, the process hereinabove is complicated and the testing is not accurate enough, and the testing result depends on the vocational levels of those skilled in the art remarkably, which has a great limitation. Therefore, it is an issue needed to be solved how to simulate the rotation angle of the prism in the backlight module.

SUMMARY

An object of the present disclosure is to provide a device for detecting a rotation angle of a prism and a method for using the same, so as to solve the issues in the related art where a manual detection of the rotation angle of the prism is not accurate and the detection result depends on the vocational levels remarkably.

A device for detecting a rotation angle of a prism is provided in some embodiments of the present disclosure, configured to detect, in the case that a prism film plate of a backlight module rotates relative to a display panel until the display panel displays a predetermined image, a rotation angle of the prism film plate relative to the display panel. The device for detecting a rotation angle of a prism includes: a stationary protractor, a film plate clamping mechanism configured to clamp the prism film plate, and a rotation mechanism which rotates the film plate clamping mechanism around an axis of the protractor. When the rotation mechanism drives the film plate clamping mechanism to rotate and the film plate clamping mechanism drives the prism film plate to rotate until the display panel displays the predetermined image, the rotation angle is detected based on an angle by which the film plate clamping mechanism rotates relative to the protractor.

Optionally, the device further includes a pointer indicating scales of the protractor. The rotation mechanism drives the film plate clamping mechanism to rotate and drives the pointer to rotate around the axis of the protractor synchronously.

Optionally, the device further includes a first supporting rod and a second supporting rod. The pointer is connected to the rotation mechanism through the first supporting rod, and the film plate clamping mechanism is connected to the rotation mechanism through the second supporting rod. The center point of a conjunction position between the first supporting rod and the rotation mechanism and an indication tip of the pointer are in a first straight line. A center point of a conjunction position between the second supporting rod and the rotation mechanism and a center point of a conjunction position between the second supporting rod and the film plate clamping mechanism are in a second straight line. The first and the second straight lines are in an identical plane.

Optionally, the first supporting rod includes a first rod and a second rod which are connected to and perpendicular to each other, the first rod is connected to the rotation mechanism, and the second rod is connected to the pointer. The second supporting rod includes a third rod and a fourth rod which are connected to and perpendicular to each other. The third rod is connected to the rotation mechanism, and the fourth rod is connected to the film plate clamping mechanism. The first rod is parallel to the third rod.

Optionally, the protractor is parallel to the first rod.

Optionally, the second rod and the fourth rod are perpendicular to the protractor.

Optionally, the pointer is parallel to the protractor.

Optionally, the protractor is semicircular and plate-like, and the axis of the protractor is a straight line perpendicular to a semicircular surface of the protractor and passing through a circle center of the semicircular surface of the protractor.

Optionally, the device further includes a stationary shaft. The rotation mechanism includes a shaft sleeve engaged with the stationary shaft and configured to rotate around the stationary shaft. The first rod is fixed onto the shaft sleeve. The third rod is fixed onto the shaft sleeve.

Optionally, the protractor is above film plate clamping mechanism.

Optionally, the protractor is parallel to the prism film plate clamped by the film plate clamping mechanism.

Optionally, the device further includes a stationary shaft. The rotation mechanism includes a shaft sleeve engaged with the stationary shaft and configured to rotate around the stationary shaft, and the film plate clamping mechanism is fixed onto the shaft sleeve.

Optionally, the protractor is on the stationary shaft, and the axis of the protractor and an axis of the stationary shaft are arranged in an identical straight line.

Optionally, the device further includes a pedestal jointed with the stationary shaft.

Optionally, a scale of the protractor corresponding to a symmetry axis of the protractor is 0 degrees, scales of two portions of the protractor at two sides of the symmetry axis are symmetric relative to the symmetry axis.

A method for using the device hereinabove to detect a rotation angle of a prism is further provided, including:

clamping a to-be-detected prism film plate of a backlight module by the film plate clamping mechanism;

turning on the backlight module and a display panel corresponding to the backlight module by switching on a circuit; and lowering an ambient brightness and rotating the film plate clamping mechanism around the axis of the protractor by turning on the rotation mechanism;

observing a display status of the display panel when the film plate clamping mechanism is rotated around the axis of the protractor; and stopping the rotation of the film plate clamping mechanism when the display panel displays a predetermined image, and reading an angle by which the film plate clamping mechanism rotates relative to the protractor, thereby obtaining a rotation angle of the prism film plate relative to the display panel.

According to the device for detecting a rotation angle of a prism hereinabove, by the presence of the protractor and by using the film plate clamping mechanism to drive the prism film plate to rotate around the axis of the protractor, when the display panel displays the predetermined image, the rotation angle of the prism film plate may be read from the protractor, thereby detecting the rotation angle of the prism film plate accurately, in compared with the related art where the manual detection of the rotation angle of the prism is not accurate enough and the detection result depends on the vocational levels remarkably.

DETAILED DESCRIPTION

Figure 1:
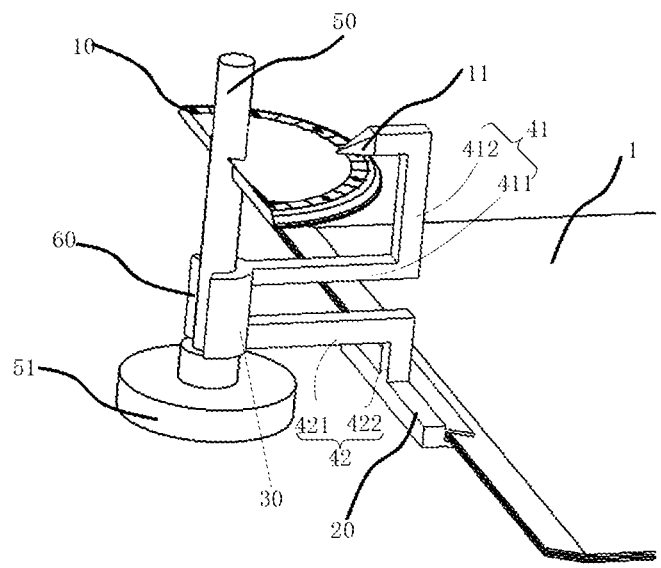
FIG. 1 is a schematic view of a device for detecting a rotation angle of a prism when clamping a prism film plate in some embodiments of the present disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to make the technical issues, the technical solutions and the advantages of the present disclosure more apparent, the present disclosure will be described hereinafter in a clear and complete manner in conjunction with the drawings and embodiments.

A device for detecting a rotation angle of a prism is provided in some embodiments of the present disclosure, and is configured to detect, in the case that a prism film plate of a backlight module rotates relative to a display panel so as to make the display panel to display a predetermined image, a rotation angle of the prism film plate relative to the display panel. The device for detecting a rotation angle of a prism includes a stationary protractor, a film plate clamping mechanism configured to clamp the prism film plate, and a rotation mechanism which rotates the film plate clamping mechanism around an axis of the protractor. The rotation mechanism drives the film plate clamping mechanism to rotate, the film plate clamping mechanism drives the prism film plate to rotate so as to make the display panel to display the predetermined image, then the rotation angle is detected based on an angle in which the film plate clamping mechanism rotates relative to the protractor.

According to the device for detecting a rotation angle of a prism hereinabove, the protractor is arranged and the film plate clamping mechanism drives the prism film plate to rotate around the axis of the protractor. When the display panel displays the predetermined image, the rotation angle of the prism film plate may be read from the protractor, thereby detecting the rotation angle of the prism film plate accurately, in compared with the related art where the manual detection of the rotation angle of the prism is not accurate enough and the detection result depends on the vocational levels remarkably.

It should be understand that, the prism film plate in the backlight module is rotated in a certain angle, so as to be matched with the polarizing film of the display panel and make the image displayed by the display panel to be of a best definition. The device for detecting a rotation angle of a prism in some embodiments of the present disclosure is designed based on the principle requirement, which is configured to detect the rotation angel of the prism film plate relative to the display panel in the case that the image displayed by the display panel is of the best definition. Therefore, such words as "predetermined image" in the present disclosure refers to an image displayed by the display panel which is of the best definition. The determination of the image of the best definition by those skilled in the art is performed as follows: rotating the prism film plate so as to make the displayed image switch between a clear condition and an unclear condition, and observing display process.

In addition, it should be noted that, the rotation angle of the prism film plate in the present disclosure refers to an angle in which the prism film plate rotates relative to a position corresponding to an original state of the display panel. When designing the parameter of the rotation angle of the prism film plate, in an initial state of the prism film plate, edges of the prism film plate are arranged to be parallel to the corresponding edges of the display panel respectively.

The structures of the device for detecting a rotation angle of a prism in some embodiments of the present disclosure will be described in detail in conjunction with FIGS. 1 and 2.

Figure 2:
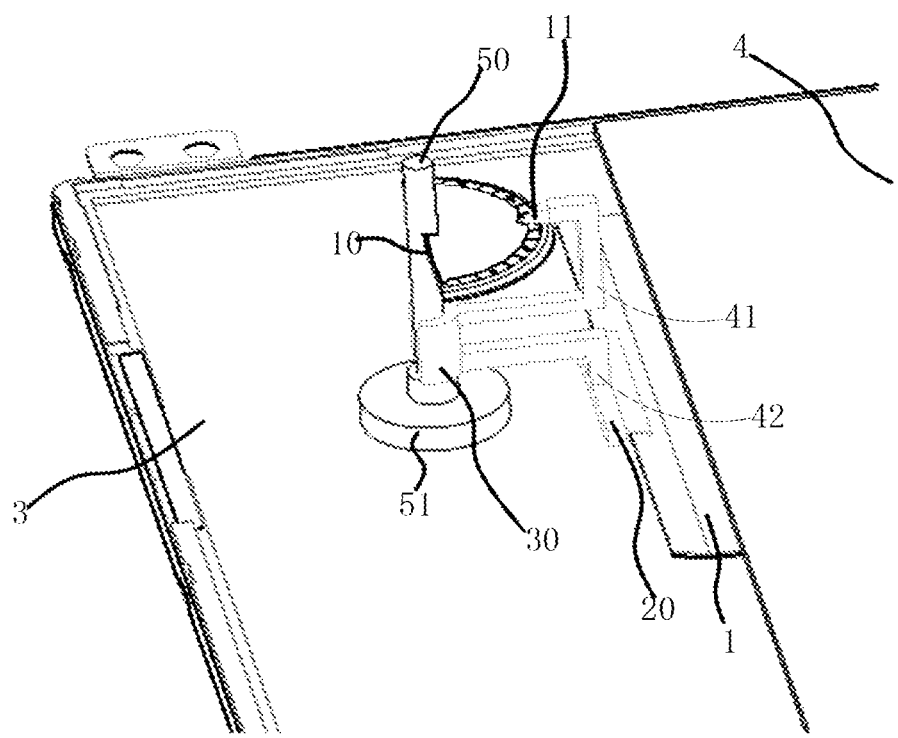
FIG. 2 is a schematic view of the device for detecting a rotation angle of a prism in use with a display panel and a backlight module.

Referring to FIGS. 1 and 2, the device for detecting a rotation angle of a prism in some embodiments of the present disclosure includes a protractor 10, a film plate clamping mechanism 20 configured to clamp the prism film plate 1 and a rotation mechanism 30 which rotates the film plate clamping mechanism 20 around an axis of the protractor 10.

To be specific, the device for detecting a rotation angle of a prism further includes a pointer 11 indicating scales of the protractor 10. The rotation mechanism 30 drives the film plate clamping mechanism 20 to rotate and drives the pointer 11 to rotate around the axis of the protractor 10 synchronously. It should be understood by those skilled in the art that, the protractor 10 may be semicircular and plate-like as shown in FIGS. 1 and 2. The scale lines indicating the angles are intersected to each other at a circle center of the semicircular surface of the protractor 10. The axis of the protractor 10 refers to a straight line perpendicular to a semicircular surface (the surface where the indication scales are arranged) of the protractor 10 and passing through a circle center of the semicircular surface of the protractor 10.

In some embodiments of the present disclosure, the pointer 11 is connected to the rotation mechanism 30 through a first supporting rod 41, and the film plate clamping mechanism 20 is connected to the rotation mechanism 30 through a second supporting rod 42. The rotation mechanism 30 drives the first supporting rod 41 and the second supporting rod 42 simultaneously, so as to make the film plate clamping mechanism 20 to rotate with the pointer 11 synchronously. In such case, the film plate clamping mechanism 20, the pointer 11 and the rotation mechanism 30 are taken as a whole and rotate synchronously, so the rotation angle in which the prism film plate is driven to rotate by the film plate clamping mechanism 20 may be read directly based on an angle in which the pointer 11 is rotated relative to the protractor 10.

In addition, the film plate clamping mechanism 20 may be formed by combining oppositely arranged elastic structures. The mechanism configured to clamp the prism film plate are commonly known by those skilled in the art, which is not the focus of the present disclosure, and the detailed description thereof is omitted herein.

In some embodiments of the present disclosure, as shown in FIGS. 1 and 2, a center point of a conjunction position between the first supporting rod 41 and the rotation mechanism 30 and an indication tip of the pointer 11 are arranged in a first straight line, a center point of a conjunction position between the second supporting rod 42 and the rotation mechanism 30 and a center point between a conjunction position of the second supporting rod 42 and the film plate clamping mechanism 20 are arranged in a second straight line, and the first and the second straight lines are arranged in the same plane. In addition, an axis of the rotation mechanism 30 may also be arranged in a plane formed by the first and the second straight lines, so as to further guarantee that the pointer 11 and the film plate clamping mechanism 20 rotate around the axis of the rotation mechanism 30 synchronously.

In some embodiments of the present disclosure, the protractor 10 is arranged above film plate clamping mechanism 20 and parallel to the prism film plate clamped by the film plate clamping mechanism 20. To be specific, the center point of the conjunction position between the first supporting rod 41 and the rotation mechanism 30 and the indication tip of the pointer 11 are arranged in the first straight line, the center point of the conjunction position of the second supporting rod 42 and the rotation mechanism 30 and the center point of the conjunction position of the second supporting rod 42 and the film plate clamping mechanism 20 are arranged in the second straight line, and the first and the second straight lines are arranged in the same vertical plane which is perpendicular to the protractor 10.

To be specific, the first supporting rod 41 includes a first rod 411 and a second rod 412 which are perpendicular to each other. The first rod 411 is connected to the rotation mechanism 30, and the second rod 412 is connected to the pointer 11. The second supporting rod 42 includes a third rod 421 and a fourth rod 422 which are perpendicular to each other. The third rod 421 is connected to the rotation mechanism 30, and the fourth rod 422 is connected to the film plate clamping mechanism 20. The first rod 411 is parallel to the third rod 421, and the first rod 411 and the second rod 421 are parallel to the protractor 10. The second rod 412 and the fourth rod 422 are perpendicular to the protractor 10, and the pointer 11 is perpendicular to the second rod 412.

Of course, the above connection of the pointer 11, the film plate clamping mechanism 20 and the rotation mechanism 30 is merely one embodiment of the device for detecting a rotation angle of a prism provided by the present disclosure, but it is not limited herein.

For example, in some embodiments of the present disclosure, the second supporting rod 42 is connected to the film plate clamping mechanism 20, so as to clamp the prism film plate at an edge thereof. According to such principle, a third supporting rod may further be arranged to be connected to another film plate clamping mechanism, so as to clamp the prism film plate at another edge thereof, as long as the third supporting rod may be rotated with the pointer and the second supporting rod synchronously. In addition, the prism film plate may be clamped more firmly when the third supporting rod is arranged.

In addition, the device for detecting a rotation angle of a prism in some embodiments of the present disclosure further includes a stationary shaft 50. The rotation mechanism 30 includes a shaft sleeve 60 engaged with the stationary shaft 50 and configured to rotate around the stationary shaft 50. The film plate clamping mechanism 20 is fixed onto the shaft sleeve 60 through the second supporting rod 42. The shaft sleeve 60 rotates relative to the stationary shaft 50, so as to drive the pointer 11 and the film plate clamping mechanism 20 to rotate around the axis of the stationary shaft 50 synchronously. In addition, the protractor 10 is arranged on the stationary shaft 50, and the axis of the protractor 10 and the axis of the stationary shaft 50 are arranged in the same straight line.

Optionally, the device for detecting a rotation angle of a prism further includes a pedestal 51 jointed with the stationary shaft 50 and configured to arrange the stationary shaft 50 onto a table board stably.

In addition, in some embodiments of the present disclosure, the scale of the protractor 10 corresponding to a symmetry axis of the protractor 10 is 0 degree, and the scales of two portions of the protractor 10 at two sides of the symmetry axis are symmetric relative to the symmetry axis. That is, a scale line corresponding to 0 degree is a symmetry axis line of the semicircular protractor 10. In compared with the protractor in the related art, a scale line corresponding to 90 degree in the protractor in the related art corresponds to the initial 0 degree in the present disclosure, and scale lines corresponding to 0 and 180 degree in the protractor in the related art correspond to 90 degree in the present disclosure.

According to the device for detecting a rotation angle of a prism, as shown in FIG. 2, prior to the step of detecting the rotation angles of the prism film plate and the polarizing film when an optimal display image is achieved, a to-be-detected prism film plate 1 is arranged between a backlight source 3 and a display panel 4 (which includes upper and the lower polarizing films), edges of the prism film plate 1 are arranged to be parallel to the corresponding edges of the display panel 4 respectively. During the test, the pedestal 51 of the device for detecting a rotation angle of a prism is arranged on the backlight source 3, then the shaft sleeve 60 is adjusted so as to move the pointer 11 of the protractor 10 to the symmetry axis of the protractor 10 corresponding to the scale of 0 degree, and the film plate clamping mechanism 20 clamps the prism film plate 1. Then, the backlight source 3 and display panel 4 are turned on, the film plate clamping mechanism 20 is moved, so as to make the shaft sleeve 60 rotate relative to the stationary shaft 50. Meanwhile, a low gray-scale image displayed by the display panel after the prism film plate is rotated is observed in a darkroom from different directions, and then an optimal display image is obtained after comparing the images observed from different directions. At this time, an angle indicated by the pointer 11 is an optimal rotation angle of the prism film plate in the parameter design of the prism film plate.

Based on the embodiments hereinabove, a method for using the device for detecting a rotation angle of a prism hereinabove is further provided in some embodiments of the present disclosure, including: clamping a to-be-detected prism film plate of the backlight module by the film plate clamping mechanism; switching on a circuit, so as to turn on the backlight module and the display panel corresponding to the backlight module; lowering an ambient brightness and turning on the rotation mechanism, so as to make the film plate clamping mechanism rotate around the axis of the protractor; observing a display status of the display panel when the film plate clamping mechanism is rotated around the axis of the protractor; and stopping the rotation of the film plate clamping mechanism in the case that the display panel displays a predetermined image, reading an angle in which the film plate clamping mechanism rotates relative to the protractor, so as to obtain a rotation angle of the prism film plate relative to the display panel.

According to the device for detecting a rotation angle of a prism and a method for using the same, it is able to detect accurately the rotation angle of the prism film plate during an assembling of the prism film plate and the display panel in the process of developing a liquid crystal module, thereby solving the issues in the related art where a manual detection of the rotation angle of the prism is not accurate and the detection result depends on the vocational levels remarkably and further shortening a developing process of the whole liquid crystal module.

The above are merely the preferred embodiments of the present disclosure. A person skilled in the art may make further modifications and improvements without departing from the principle of the present disclosure, and these modifications and improvements shall also fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for detecting a rotation angle of a prism, configured to detect, in case that a prism film plate of a backlight module rotates relative to a display panel until the display panel displays a predetermined image, a rotation angle of the prism film plate relative to the display panel, wherein the device for detecting a rotation angle of a prism comprises:
a stationary protractor;
a film plate clamping mechanism configured to clamp the prism film plate; and
a rotation mechanism which rotates the film plate clamping mechanism around an axis of the protractor, wherein the film plate clamping mechanism is in an unfixed connection with the protractor;
wherein when the rotation mechanism drives the film plate clamping mechanism to rotate and the film plate clamping mechanism drives the prism film plate to rotate until the display panel displays the predetermined image, the rotation angle is detected based on an angle by which the film plate clamping mechanism rotates relative to the protractor;
the device further comprises:
a pointer indicating scales of the protractor, wherein the rotation mechanism drives the film plate clamping mechanism to rotate and drives the pointer to rotate around the axis of the protractor synchronously;
a first supporting rod and a second supporting rod;
wherein the pointer is connected to the rotation mechanism through the first supporting rod, and the film plate clamping mechanism is connected to the rotation mechanism through the second supporting rod;
a center point of a conjunction position between the first supporting rod and the rotation mechanism and an indication tip of the pointer are in a first straight line; a center point of a conjunction position between the second supporting rod and the rotation mechanism and a center point of a conjunction position between the second supporting rod and the film plate clamping mechanism are in a second straight line; and the first straight line and the second straight line are in an identical plane.

2. The device according to claim 1, wherein the first supporting rod comprises a first rod and a second rod which are connected to and perpendicular to each other, the first rod is connected to the rotation mechanism, and the second rod is connected to the pointer;
the second supporting rod comprises a third rod and a fourth rod which are connected to and perpendicular to each other, the third rod is connected to the rotation mechanism, and the fourth rod is connected to the film plate clamping mechanism; and
the first rod is parallel to the third rod.

3. The device according to claim 2, wherein the protractor is parallel to the first rod.

4. The device according to claim 3, wherein the second rod and the fourth rod are perpendicular to the protractor.

5. The device according to claim 4, wherein the pointer is parallel to the protractor.

6. The device according to claim 2, wherein the protractor is semicircular and plate-like; and the axis of the protractor is a straight line perpendicular to a semicircular surface of the protractor and passing through a circle center of the semicircular surface of the protractor.

7. The device according to claim 6, wherein the scale of the protractor corresponding to a symmetry axis of the protractor is 0 degree, and the scales of two portions of the protractor at two sides of the symmetry axis are symmetric relative to the symmetry axis.

8. The device according to claim 6, further comprising a stationary shaft; wherein the rotation mechanism comprises a shaft sleeve engaged with the stationary shaft and configured to rotate around the stationary shaft; and
the first rod is fixed onto the shaft sleeve; the third rod is fixed onto the shaft sleeve.

9. The device according to claim 8, wherein the protractor is on the stationary shaft, and the axis of the protractor and an axis of the stationary shaft are in an identical straight line.

10. The device according to claim 1, wherein the protractor is above film plate clamping mechanism.

11. The device according to claim 1, wherein the protractor is parallel to the prism film plate clamped by the film plate clamping mechanism.

12. The device according to claim 1, further comprising a stationary shaft; wherein the rotation mechanism comprises a shaft sleeve engaged with the stationary shaft and configured to rotate around the stationary shaft, and the film plate clamping mechanism is fixed onto the shaft sleeve.

13. The device according to claim 12, wherein the protractor is on the stationary shaft, and the axis of the protractor and an axis of the stationary shaft are in an identical straight line.

14. The device according to claim 12, further comprising a pedestal jointed with the stationary shaft.

15. The device according to claim 1, wherein a scale of the protractor corresponding to a symmetry axis of the protractor is 0 degree, and scales of two portions of the protractor at two sides of the symmetry axis are symmetric relative to the symmetry axis.

16. A method for using the device according to claim 1 to detect a rotation angle of a prism, comprising:
   clamping a to-be-detected prism film plate of a backlight module by the film plate clamping mechanism;
   turning on the backlight module and a display panel corresponding to the backlight module by switching on a circuit; and
   lowering an ambient brightness and rotating the film plate clamping mechanism around the axis of the protractor by turning on the rotation mechanism;
   observing a display status of the display panel when the film plate clamping mechanism is rotated around the axis of the protractor; and
   stopping the rotation of the film plate clamping mechanism when the display panel displays a predetermined image, and reading an angle by which the film plate clamping mechanism rotates relative to the protractor, thereby obtaining a rotation angle of the prism film plate relative to the display panel.

\* \* \* \* \*